(12) United States Patent
Hong

(10) Patent No.: US 11,968,582 B2
(45) Date of Patent: Apr. 23, 2024

(54) SERVICE HANDOVER METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 387 days.

(21) Appl. No.: 17/613,161

(22) PCT Filed: May 23, 2019

(86) PCT No.: PCT/CN2019/088179
§ 371 (c)(1),
(2) Date: Nov. 22, 2021

(87) PCT Pub. No.: WO2020/232711
PCT Pub. Date: Nov. 26, 2020

(65) Prior Publication Data
US 2022/0210713 A1    Jun. 30, 2022

(51) Int. Cl.
*H04W 36/14* (2009.01)
*H04W 36/00* (2009.01)
(Continued)

(52) U.S. Cl.
CPC ........ *H04W 36/14* (2013.01); *H04W 36/0011* (2013.01); *H04W 36/30* (2013.01); *H04W 88/06* (2013.01)

(58) Field of Classification Search
None
See application file for complete search history.

(56) References Cited

U.S. PATENT DOCUMENTS

2003/0207688 A1* 11/2003 Nikkelen .......... H04W 36/0066
455/438
2006/0221903 A1* 10/2006 Kauranen ............. H04W 36/14
370/331
(Continued)

FOREIGN PATENT DOCUMENTS

CN    103428353 A    12/2013
CN    108990122 A    12/2018

OTHER PUBLICATIONS

International Patent Application No. PCT/CN2019/088179 International Search Report dated Feb. 1, 2020, 2 pages.
(Continued)

*Primary Examiner* — Phuoc H Nguyen
(74) *Attorney, Agent, or Firm* — COZEN O'CONNOR

(57) ABSTRACT

A service handover method includes receiving a handover request signaling sent by a multi-card user equipment. The handover request signaling is configured to request a handover to a second communication system, the handover request signaling carries second service information, and the second service information is service information of a to-be-transmitted service of the multi-card user equipment in the second communication system. The method further includes generating a handover response signaling in response to determining to allow the multi-card user equipment to perform a handover operation based on first service information and the second service information. The handover response signaling carries handover configuration information, and the first service information is service information corresponding to the to-be-transmitted service of the multi-card user equipment in the first communication system.

18 Claims, 11 Drawing Sheets

(51) Int. Cl.
H04W 36/30 (2009.01)
H04W 88/06 (2009.01)

(56) References Cited

U.S. PATENT DOCUMENTS

| | | | | |
|---|---|---|---|---|
| 2014/0031036 A1* | 1/2014 | Koo | .................. | H04W 36/14 |
| | | | | 455/434 |
| 2015/0131619 A1 | 5/2015 | Zhu et al. | | |
| 2017/0111841 A1* | 4/2017 | Henttonen | ............ | H04W 36/28 |
| 2018/0063764 A1* | 3/2018 | Bollapalli | ............. | H04W 12/06 |
| 2019/0297550 A1* | 9/2019 | Zhang | ................... | H04W 48/18 |
| 2019/0364463 A1* | 11/2019 | Youn | ..................... | H04W 76/12 |
| 2020/0107235 A1* | 4/2020 | Peisa | ................. | H04W 36/0061 |
| 2021/0007028 A1* | 1/2021 | Liang | ................ | H04W 36/0027 |
| 2023/0276311 A1* | 8/2023 | Wu | .................. | H04W 36/0022 |
| | | | | 370/331 |

OTHER PUBLICATIONS

European Patent Application No. 19929975.1; extended Search and Opinion dated May 30, 2022; 11 pages.

* cited by examiner

SERVICE HANDOVER METHOD AND APPARATUS

CROSS-REFERENCE TO RELATED APPLICATION

This application is a national phase of International Application No. PCT/CN2019/088179, filed on May 23, 2019, the content of which is hereby incorporated by reference in its entirety.

TECHNICAL FIELD

The present disclosure relates to a field of communication technologies, and more particularly, to a method of service handover for a multi-card user equipment between first and second communication systems.

BACKGROUND

In related arts, a processing manner adopted by multi-card user equipment (UE) is mainly implemented by a corresponding UE manufacturer, leading to a problem that there are different behaviors and processing manners adopted by the multi-card UEs of different manufacturers. For example, while the multi-card UE is communicating with a first communication system, the multi-card UE receives a paging signaling from the second communication system and needs to respond to a service of the second communication system. Response algorithms provided by the multi-card UEs of different manufacturers may be different.

SUMMARY

In one embodiment, a service handover method is provided, which is applied to a first base station. The first base station is a base station of a first communication system that is currently communicating with a multi-card user equipment. The method includes:

receiving a handover request signaling sent by the multi-card user equipment, in which the handover request signaling is configured to request a handover to a second communication system, the handover request signaling carries second service information, the second service information is service information of a to-be-transmitted service of the multi-card user equipment in the second communication system;

generating a handover response signaling in response to allowing the multi-card user equipment to execute a handover operation based on first service information and the second service information, in which the handover response signaling carries handover configuration information, and the first service information is service information corresponding to a to-be-transmitted service of the multi-card user equipment in the first communication system; and sending the handover response signaling to the multi-card user equipment.

In one embodiment, a service handover method is provided, which is applied to a multi-card user equipment. The method includes:

generating a handover request signaling based on second service information of a to-be-transmitted service in a second communication system, in which the handover request signaling is configured to request a first base station to allow the multi-card user equipment to perform a handover to the second communication system, and the handover request signaling carries the second service information corresponding to the to-be-transmitted service of the multi-card user equipment in the second communication system; and sending the handover request signaling to a first base station, in which the first base station is a base station of a first communication system that is currently communicating with the multi-card user equipment.

In one embodiment, a base station is provided. The base station includes a processor; and a memory, configured to store an instruction executable by the processor;

in which the processor is configured to:

receive a handover request signaling sent by a multi-card user equipment, wherein the handover request signaling is configured to request a handover to a second communication system, the handover request signaling carries second service information, and the second service information is service information of a to-be-transmitted service of the multi-card user equipment in the second communication system;

generate a handover response signaling in response to determining to allow the multi-card user equipment to perform a handover operation based on first service information and the second service information, in which the handover response signaling carries handover configuration information, and the first service information is service information corresponding to a to-be-transmitted service of the multi-card user equipment in a first communication system; and send the handover response signaling to the multi-card user equipment.

It is to be understood that the above general description and the following detailed description are only exemplary and explanatory and do not limit the disclosure.

BRIEF DESCRIPTION OF THE DRAWINGS

The drawings herein are incorporated into the specification and constitute a part of the specification, show embodiments conforming to the present invention, and together with the specification are used to explain the principle of the present invention.

DETAILED DESCRIPTION

Here, exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the disclosure. On the contrary, they are merely examples of devices and methods consistent with some aspects of the disclosure as detailed in the appended claims.

Multi-card user equipment (UEs) of different manufacturers respond to a paging signaling of a second communication system with different algorithm implementations, which may cause some multi-card UEs to blindly reject or respond to the service of the second communication system, leading to poor service continuity of the multi-card UE and low service transmission efficiency.

Therefore, the disclosure provides a service handover method, a service handover apparatus, a multi-card user equipment, and a base station, which will be described in detail below.

Technical solutions according to the disclosure is applicable to a scenario where a subscriber identity module of the multi-card UE is in a radio resource control (RRC) connected state (RRC_CONNECTED), while the other subscriber identity module is in an RRC idle state (RRC_IDLE) or an RRC inactive state (RRC_INACTIVE).

Figure 1A:
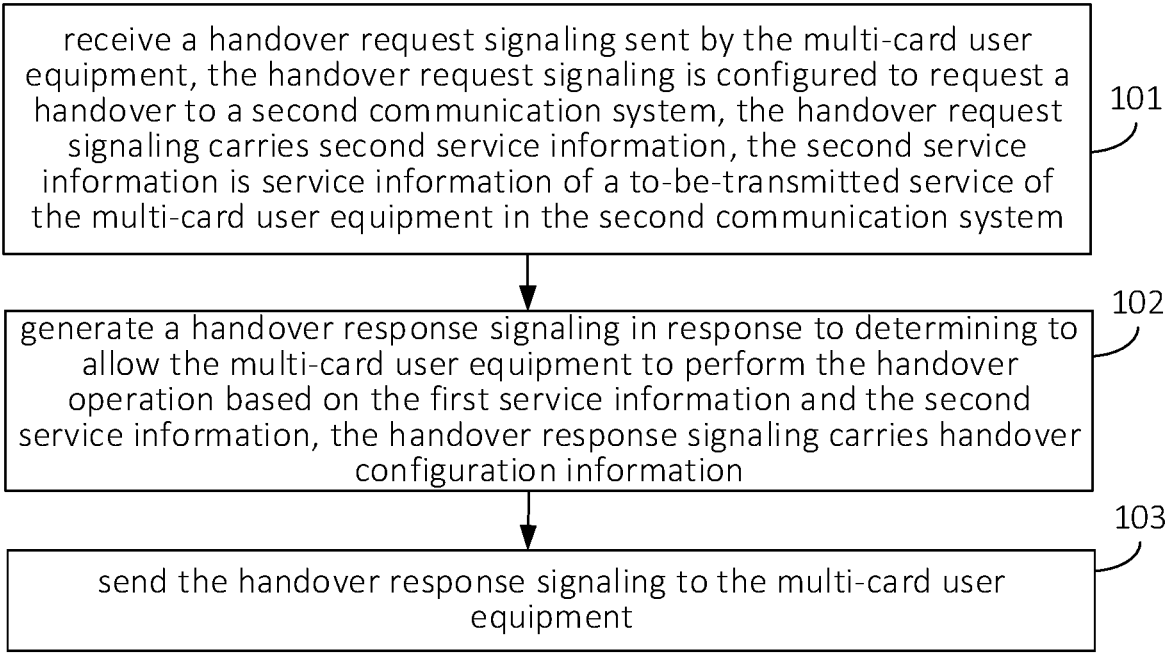
FIG. 1A is a flowchart illustrating a service handover method according to an example embodiment.
Figure 1B:
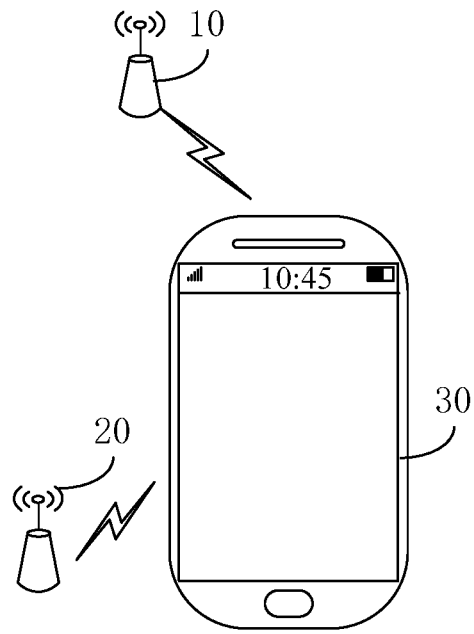
FIG. 1B is a schematic diagram illustrating an application scenario a service handover method according to an example embodiment.

FIG. 1A is a flowchart illustrating a service handover method according to an exemplary embodiment. FIG. 1B is a schematic diagram illustrating an application scenario of a service handover method according to an exemplary embodiment. The service handover method can be applied to a first base station. As illustrated in FIG. 1A, the service handover method includes the following blocks 101-103.

In block 101, a handover request signaling sent by the multi-card UE is received. The handover request signaling is configured to request a handover to a second communication system is received. The handover request signaling carries second service information. The second service information is service information of a to-be-transmitted service of the multi-card UE in the second communication system.

In an embodiment, the first base station is a base station of the first communication system that the multi-card UE is currently communicating with.

In an embodiment, after acquiring the second service information of the to-be-transmitted service in the second communication system, the multi-card UE sends the handover request signaling carrying the second service information to the first base station.

In an embodiment, after receiving the handover request signaling, the first base station can obtain the second service information from the handover request signaling through analysis.

In an embodiment, the second service information may include a service type of the to-be-transmitted service of the multi-card UE in the second communication system. For example, the service type of the to-be-transmitted service is ultra-reliability and low-latency communication (URLLC for short) service. In another embodiment, the second service information may include a quality of service class identifier of the to-be-transmitted service. For example, the quality of service class identifier of the to-be-transmitted service is 3. In still another embodiment, the second service information may also include a data volume of the to-be-transmitted service. For example, the data volume of the to-be-transmitted service of the second service information exceeds a maximum buffered data volume.

In an embodiment, the second service information may also include other information capable of representing service characteristics of the to-be-transmitted service in the second communication system, such as a periodicity of service data transmission and requirements of the service data on bandwidth, rate, time delay, and reliability.

In block 102, a handover response signaling is generated in response to determining to allow the multi-card UE to execute a handover operation based on the first service information and the second service information.

In an embodiment, the first service information includes the service type of the to-be-transmitted service of the multi-card UE in the first communication system, and/or the quality of service class identifier of the to-be-transmitted service of the multi-card UE in the first communication system, and/or the data volume of the to-be-transmitted service of the multi-card UE in the first communication system.

In an embodiment, the handover response signaling carries handover configuration information. The first service information is service information corresponding to the to-be-transmitted service of the multi-card UE in the first communication system.

In an embodiment, the handover configuration information may include an expected interruption time that the multi-card UE interrupts the to-be-transmitted service in the first communication system. That is, the handover configuration information may be used to indicate when the multi-card UE interrupts the service of the first communication system to perform the handover to the second communication system. In an embodiment, the handover configuration information may include an expected time length that the multi-card UE is in the second communication system. That is, the handover configuration information may be used indicate how long the multi-card UE stays in the second communication system to perform the handover to the first communication system after staying for the expected time length. In an embodiment, the handover configuration information may include an expected interruption time that the multi-card UE interrupts the to-be-transmitted service in the first communication system and an expected time length that the multi-card UE is in the second communication system.

Figure 2:
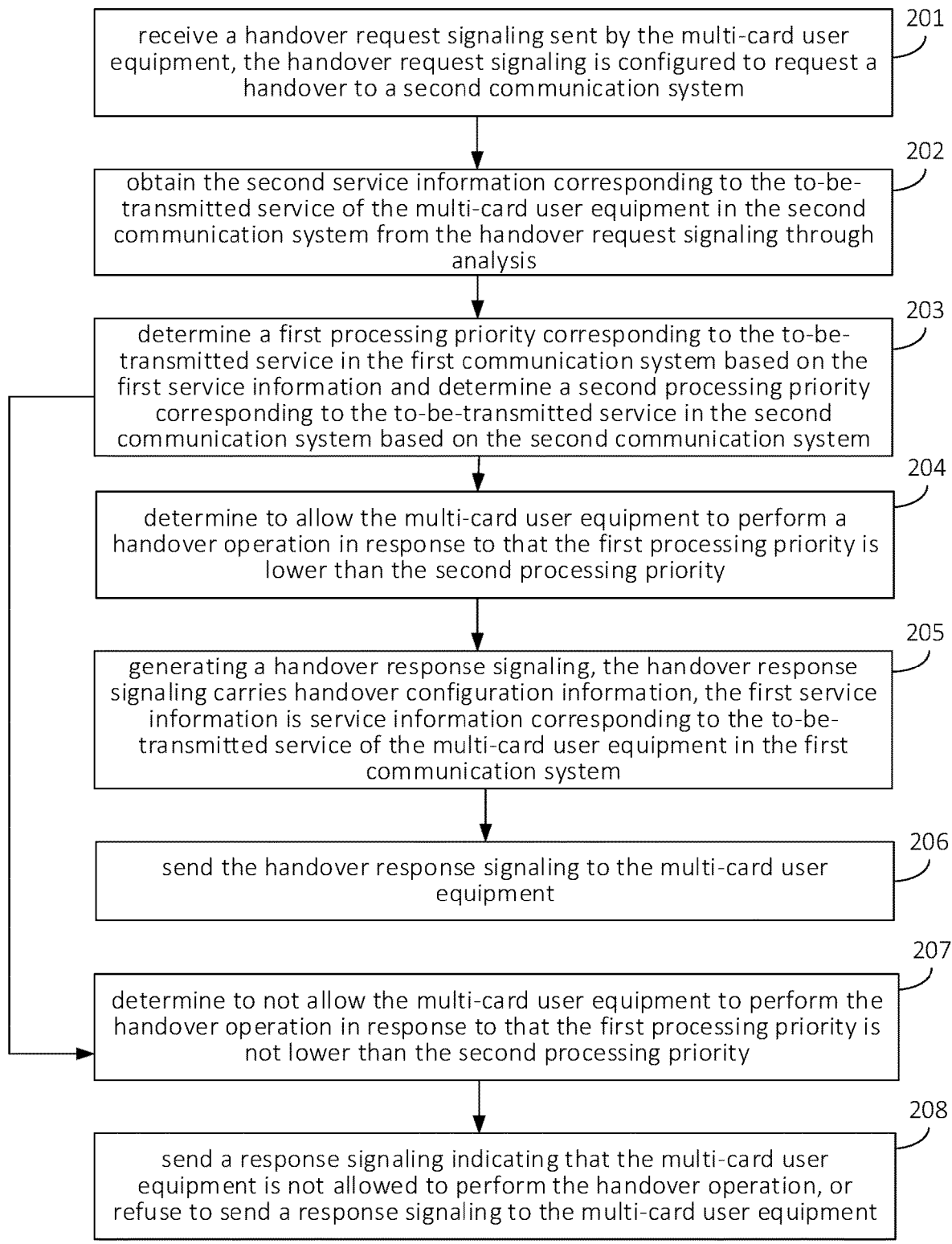
FIG. 2 is a flowchart illustrating another service handover method according to an example embodiment.
Figure 3:
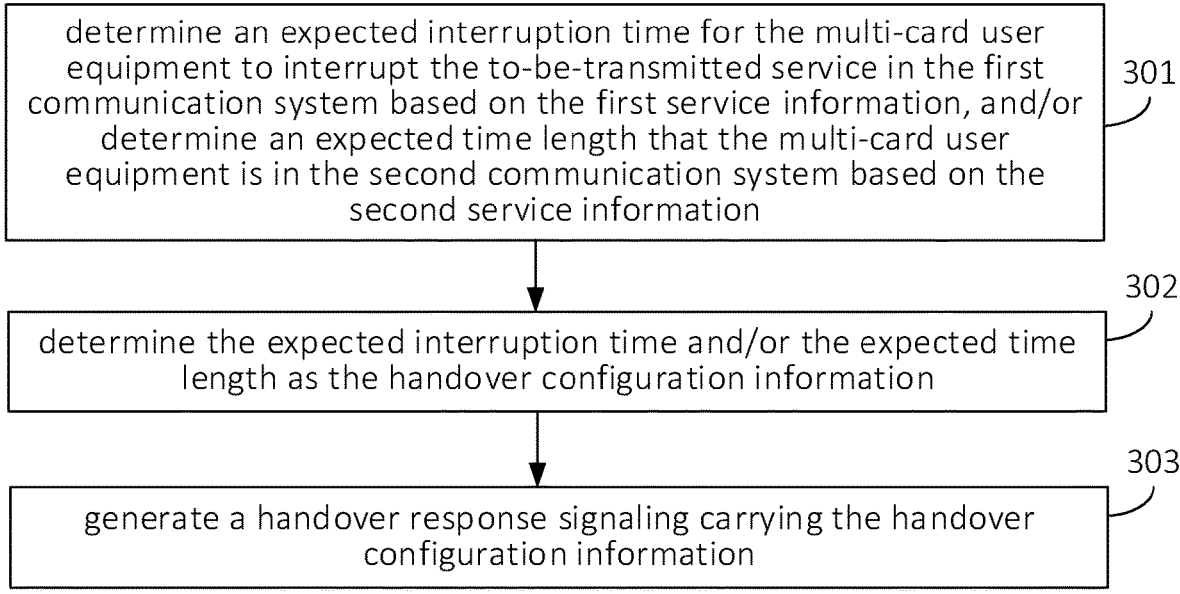
FIG. 3 is a flowchart illustrating yet another service handover method according to an example embodiment.

In an embodiment, the method for determining the handover configuration information may refer to embodiments described in FIG. 2 and FIG. 3, which will not be described in detail here.

In an embodiment, the first base station may determine a first processing priority corresponding to the to-be-transmitted service in the first communication system and a second processing priority corresponding to the to-be-transmitted service in the second communication system based on a preset handover algorithm, and determine whether to execute the handover operation based on the first processing priority and the second processing priority. If the first processing priority is higher than the second processing priority, it can be determined not to perform the handover operation. If the first processing priority is not higher than the second processing priority, it may be determined to perform the handover operation.

In an embodiment, the first base station may determine a processing priority corresponding to the service (i.e., the first processing priority corresponding to the service in the first communication system and the second processing priority corresponding to the service in the second communication system) based on the requirements of the service data of the to-be-transmitted service on the bandwidth, the rate, the time delay, and the reliability.

In an embodiment, the first base station may determine the processing priority corresponding to the service (i.e., the first processing priority corresponding to the service in the first communication system and the second processing priority corresponding to the service in the second communication system) based on the quality of service class identifier of the service data of the to-be-transmitted service.

In an embodiment, the first base station may determine the processing priority corresponding to the service (i.e., the first processing priority corresponding to the service in the first communication system and the second processing priority corresponding to the service in the second communication system) based on the data volume of the service data of the to-be-transmitted service.

In an embodiment, the first base station may determine the processing priority of the to-be-transmitted service by comprehensively considering the service type, the quality of service class identifier, and the data volume of the service in the first communication system and the service in the second communication system.

In an embodiment, the preset handover algorithm used by the first base station to determine whether to allow the multi-card UE to perform the handover operation may be determined by an operator network based on massive statistical data. In an embodiment, the preset handover algorithm used by the first base station to determine whether to allow the multi-card UE to perform the handover operation may be pre-arranged by a communication protocol.

In block 103, a handover response signaling is sent to the multi-card UE.

In an exemplary scenario, as illustrated in FIG. 1B, a first base station 10, a second base station 20, and a multi-card UE 30 are included. The first base station 10 is a base station of the first communication system that is currently communicating with the multi-card UE. The second base station is a base station of the second communication system to which the multi-card UE is to perform the handover. When the multi-card UE 30 obtains the service information of the second communication system, it can be determined whether to allow the multi-card UE to perform the service handover based on the service information of the first communication system and the service information of the second communication system. Therefore, a handover configuration that is most suitable for the current network scenario can be set for the multi-card UE to perform the service handover.

In the embodiment, as described in the above blocks 101 to 103, when the base station of the first communication system that the multi-card user equipment is currently communicating with receives the handover request signaling for requesting a handover the second communication system sent by the multi-card UE, the base station can determine whether to allow the multi-card UE to perform the handover based on the first service information corresponding to the to-be-transmitted service in the first communication system and the second service information corresponding to the to-be-transmitted service in the second communication system. The base station sends the handover response signaling carrying the handover configuration information to the multi-card UE in response to determining to allow the multi-card UE to perform the handover. Therefore, in the technical solution of the present disclosure, when the paging signal is triggered by the second communication system of the multi-card user equipment, the service information of the first communication system and the second communication system is comprehensively considered before the rejection or response to the second communication system is executed. Therefore, with the technical solutions according to the disclosure that the service of the second communication system is rejected or responded to after comprehensively considering the service information of the first communication system and the second communication system when a paging signaling triggered by the second communication system is received by the multi-card UE, such that a problem, existing in related arts, of poor service continuity and low service transmission efficiency of the multi-card UE caused by the multi-card UE blindly rejecting or responding to the service of the second communication system can be solved, thereby improving the service continuity and the transmission efficiency of the service data of the multi-card UE.

Technical solutions according to embodiments of the disclosure will be described in combination with some specific embodiments below.

FIG. 2 is a flowchart illustrating another service handover method according to an example embodiment, which illustrates how the first station determines whether to allow the multi-card UE to perform the handover with the above-mentioned method according to embodiments of the disclosure. As illustrated in FIG. 2, the method includes the following.

In block 201, a handover request signaling sent by a multi-card UE is received. The handover request signaling is configured to request a handover to the second communication system.

In block 202, second service information corresponding to a to-be-transmitted service of the multi-card UE in the second communication system is obtained from the handover request signaling through analysis.

In an embodiment, implementation of the blocks 201 and 202 can refer to the descriptions of the block 101 in the embodiment illustrated in FIG. 1A, which will not be described in detail here.

In block 203, a first processing priority corresponding to the to-be-transmitted service in the first communication system is determined based on the first service information and a second processing priority corresponding to the to-be-transmitted service in the second communication system is determined based on the second service information, and a block 204 or a block 207 is executed.

In an embodiment, the first base station may determine the first processing priority corresponding to the to-be-transmitted service in the first communication system and the second processing priority corresponding to the to-be-transmitted service in the second communication system based on a preset handover algorithm. The first base station may determine whether to perform a handover operation based on the first processing priority and the second processing priority. If the first processing priority is higher than the second processing priority, the first base station may determine to not perform the handover. If the first processing priority is not higher than the second processing priority, the first base station can determine to perform the handover.

In an embodiment, the first base station may determine the processing priority corresponding to the service (i.e., the first processing priority corresponding to the service in the first communication system and the second processing priority corresponding to the service in the second communication system) based on the requirements of the service data of the to-be-transmitted service on the bandwidth, the rate, the time delay, and the reliability.

In an embodiment, the first base station may determine the processing priority corresponding to the service (i.e., the first processing priority corresponding to the service in the first communication system and the second processing priority corresponding to the service in the second communication system) based on the quality of service class identifier of the service data of the to-be-transmitted service.

In an embodiment, the first base station may determine the processing priority corresponding to the service (i.e., the first processing priority corresponding to the service in the first communication system and the second processing priority corresponding to the service in the second communication system) based on the data volume of the service data of the to-be-transmitted service.

In an embodiment, the first base station may determine the processing priority of the to-be-transmitted service by comprehensively considering the service type, the quality of service class identifier, and the data volume of the service in the first communication system and the service in the second communication system.

In an embodiment, the preset handover algorithm used by the first base station to determine whether to allow the multi-card UE to perform a handover may be determined by a operator network based on massive statistical data. In an embodiment, the preset handover algorithm used by the first base station to determine whether to allow the multi-card UE to perform the handover may be pre-arranged by a communication protocol.

In block 204, if the first processing priority is lower than the second processing priority, it is determined to allow the multi-card UE to perform the handover operation.

In block 205, a handover response signaling is generated. The handover response signaling carries handover configuration information. The first service information is service information corresponding to the to-be-transmitted service of the multi-card UE in the first communication system.

In block 206, the handover response signaling is sent to the multi-card UE, and the process ends.

In an embodiment, the descriptions of the blocks 205 and 206 can refer to the descriptions of the blocks 103 and 104 in embodiments illustrated in FIG. 1A, which will not be described in detail here.

In block 207, if the first processing priority is not lower than the second processing priority, it is determined to not allow the multi-card UE to perform the handover.

In block 208, a response signaling indicating that the multi-card UE is not allowed to perform the handover operation is sent to the multi-card UE, or sending a response signaling to the multi-card UE is refused.

In an embodiment, by sending, to the multi-card UE, the response signaling indicating that the multi-card UE is not allowed to perform the handover operation, it can clearly indicate that the multi-card UE is not allowed currently to perform the handover operation, thereby avoiding a problem of waste of signaling resources caused by repeated transmission of the handover request signaling by the multi-card UE.

In an embodiment, the response signaling indicating that the multi-card UE is not allowed to perform the handover operation may also carry indication information indicating a time period (e.g., within a preset time period) after which the multi-card UE can resend the handover request signaling.

In an embodiment, by refusing to send a response signaling to the multi-card UE, the waste of signaling resources of the first base station can be reduced.

In this embodiment, as described in the above blocks 201 to 208, the base station can determine whether to allow the multi-card UE to perform handover based on the first service information and the second service information, and set the handover configuration for the multi-card UE in response to allowing the multi-card UE to perform the handover operation, to indicate when the multi-card UE performs the handover and when the multi-card UE perform a handover back to the first communication system. In this way, the first base station can set the handover configuration that is most suitable for the current network scenario for the multi-card UE to perform the service handover, such that a problem, existing in related arts, of poor service continuity and low service transmission efficiency of the multi-card UE caused by the multi-card UE blindly rejecting or responding to the service of the second communication system can be solved, thereby improving the service continuity and the transmission efficiency of the service data of the multi-card UE.

FIG. 3 is a flowchart illustrating another service handover method according to an exemplary embodiment. This embodiment illustrates how the first base station generates the handover response signaling with the above-mentioned method according to the disclosure. As illustrated in FIG. 3, the method includes the following.

In block 301, an expected interruption time is determined for the multi-card UE to interpret the to-be-transmitted service in the first communication system is determined based on the first service information, and/or an expected time length that the multi-card UE is in the second communication system is determined based on the second service information.

In an embodiment, the first base station may determine, based on the first service information, a duration required by the multi-card UE to process a service in the first communication system that needs to be processed as quickly as possible (e.g., a service with a high time delay requirement or a service with a high quality of service), to determine the expected interruption time for the multi-card UE to interrupt the to-be-transmitted service in the first communication system.

In an embodiment, the first base station may also determine a time length required by the multi-card UE to execute the service in the second communication system based on the second service information, to determine the expected time length that the multi-card UE communicates with the second communication system.

In an embodiment, the first base station may also determine the expected interruption time for the multi-card UE to interrupt the to-be-transmitted service in the first communication system and the expected time length that the multi-card UE communicates with the second communication system by comprehensively considering the first service information and the second service information.

In block 302, the expected interruption time and/or the expected time length are determined as the handover configuration information.

In block 303, a handover response signaling carrying the handover configuration information is generated.

In this embodiment, as described in the above blocks 301 to 303, the first base station can configure suitable handover configuration information for the UE based on the first service information in the first communication system and the second service information in the second communication system, thereby solving a problem of poor continuity of service transmission and poor user experience caused by unsatisfactory handover configuration in multi-card UE.

Figure 4:
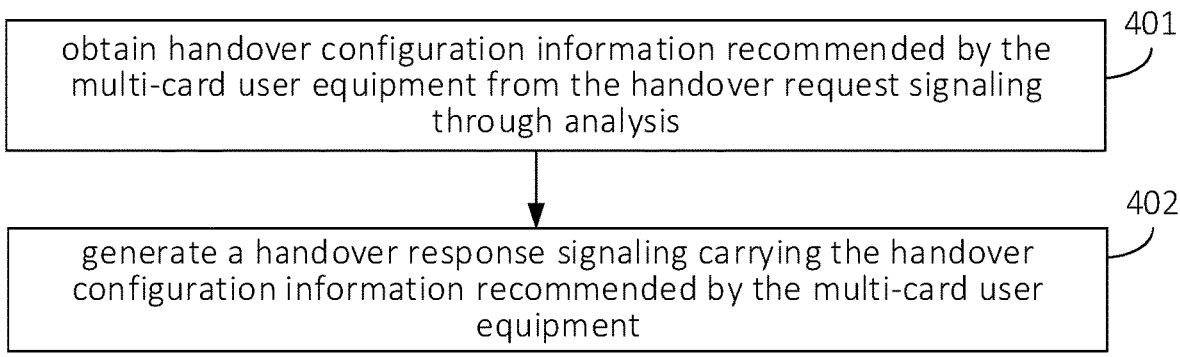
FIG. 4 is a flowchart showing yet another service handover method according to an example embodiment.

FIG. 4 is a flowchart illustrating yet another service handover method according to an exemplary embodiment. This embodiment illustrates how the first base station generates the handover response signaling with the above-mentioned method according to embodiments of the disclosure. As illustrated in FIG. 4, the method includes the following.

In block 401, the handover configuration information recommended by the multi-card UE is obtained from the handover request signaling through analysis.

In an embodiment, if the handover request signaling sent by the multi-card UE indicates the handover configuration information recommended by the multi-card UE, the first base station may follow the handover configuration information recommended by the multi-card UE to set suitable handover configuration information for multi-card UE.

In an embodiment, if the first base station determines, based on the first service information and the second service information, that the recommended handover configuration information in the handover request signaling sent by the multi-card UE is unreasonable, the first base station can configure suitable handover configuration information for the multi-card UE based on the first service information and the second service information.

In block 402, a handover response signaling carrying the handover configuration information recommended by the multi-card UE is generated.

In this embodiment, through the above blocks 401 and 402, the first base station can configure the suitable handover configuration information for the multi-card UE based on the handover request signaling sent by the UE, thereby avoiding the poor continuity of transmitting the service data caused by unreasonable service handover of the multi-card UE.

Figure 5:
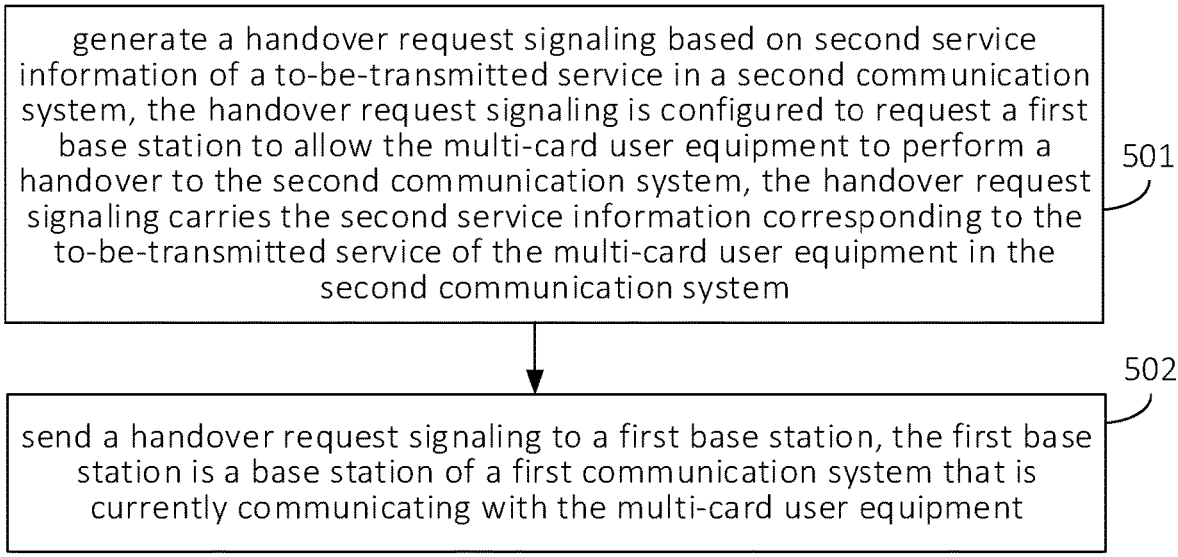
FIG. 5 is a flowchart illustrating a service handover method according to an example embodiment.

FIG. 5 is a flowchart illustrating a service handover method according to an exemplary embodiment. The service handover method can be applied to a base station device. As illustrated in FIG. 5, the service handover method includes the following blocks 501-502.

In block 501, a handover request signaling is generated based on the second service information of the to-be-transmitted service in the second communication system. The handover request signaling is configured to request the first base station to allow the multi-card UE to perform a handover to the second communication system. The handover request signaling carries the second service information corresponding to the to-be-transmitted service of the multi-card UE in the second communication system.

In an embodiment, the second service information may include the service type of the to-be-transmitted service of the multi-card UE in the second communication system. For example, the service type of the to-be-transmitted service is URLLC service or the service type of the to-be-transmitted service is a video communication service. In another embodiment, the second service information may include the quality of service class identifier of the to-be-transmitted service. For example, the quality of service class identifier of the to-be-transmitted service is 3. In another embodiment, the second service information may also include the data volume of the to-be-transmitted service. For example, the data volume of the to-be-transmitted service of the second service information exceeds a maximum buffered data volume.

In an embodiment, the second service information may also include other information representing the service characteristics of the to-be-transmitted service in the second communication system, such as the periodicity of service data transmission and the requirements of the service data on the bandwidth, the rate, the time delay, and the reliability.

In block 502, the handover request signaling is sent to the first base station. The first base station is a base station of the first communication system with which the multi-card UE is currently communicating.

In an example scenario, as illustrated in FIG. 1B, a first base station 10, a second base station 20, and a multi-card UE 30 are included. The first base station 10 is a base station of the first communication system that is currently communicating with the multi-card UE. The second base station is a base station of the second communication system to which the multi-card UE is to perform the handover. When the multi-card UE 30 obtains the service information of the second communication system, the multi-card UE 30 can send the handover request signaling to the first base station 10, and the handover operation is executed or not executed based on the response from the first base station 10. Therefore, a handover configuration that is most suitable for the current network scenario can be set for the multi-card UE to perform the service handover.

In the embodiment, as described in the above blocks 501 and 502, when the multi-card UE obtains the service information of the second communication system, the multi-card UE can send the handover request signaling to the first base station of the first communication system that is currently communicating with the multi-card UE. It is determined whether to allow the multi-card UE to perform the handover based on the first service information corresponding to the to-be-transmitted service and the second service information corresponding to the to-be-transmitted service in the second communication system. In this way, a problem, existing in related arts, of poor service continuity and low service transmission efficiency of the multi-card UE caused by the multi-card UE blindly rejecting or responding to the service of the second communication system can be solved, thereby improving the service continuity and the transmission efficiency of the service data of the multi-card UE.

Figure 6:
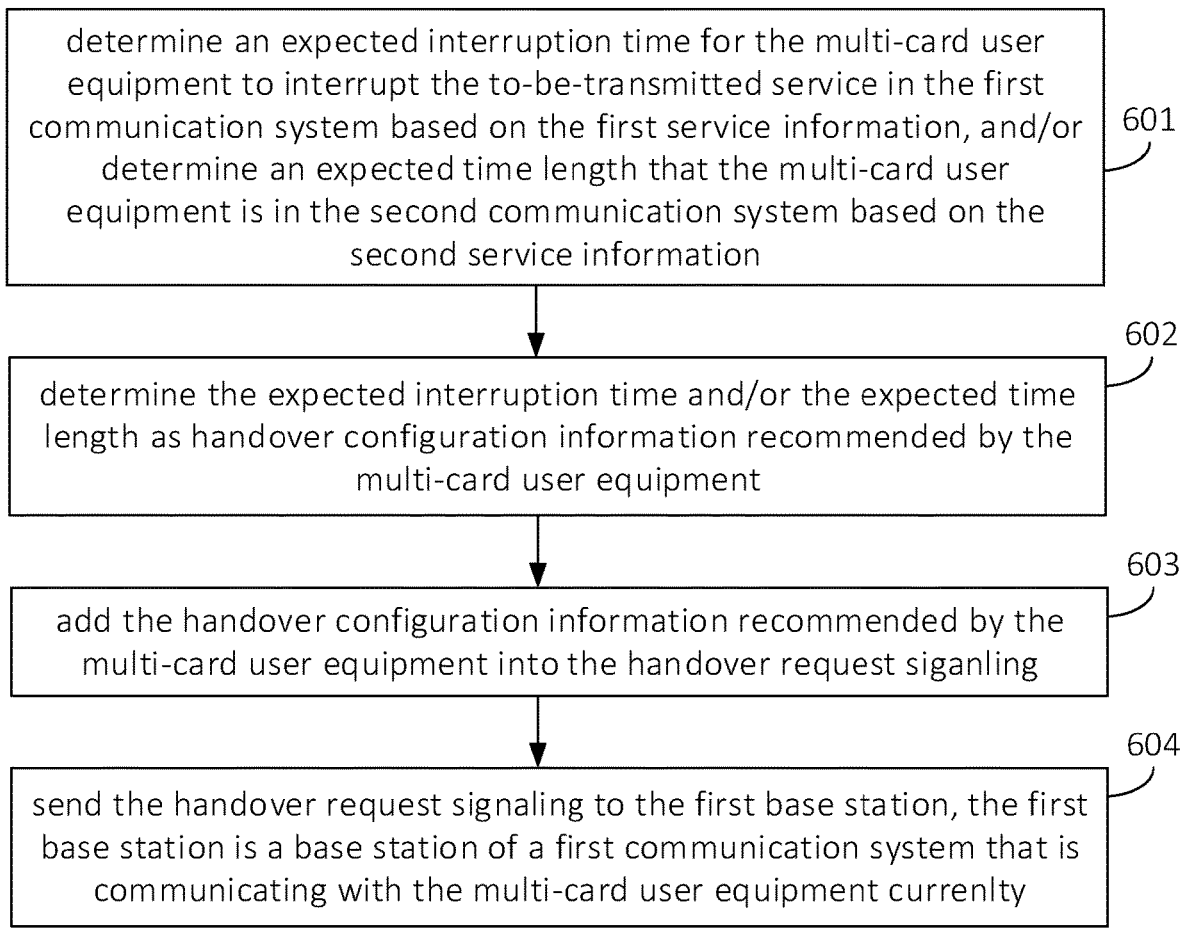
FIG. 6 is a flowchart illustrating another service handover method according to an example embodiment.

FIG. 6 is a flowchart illustrating another service handover method according to an example embodiment, which illustrates how the multi-card UE generates the handover request signaling containing the handover configuration information with the above method according to embodiments of the disclosure. As illustrated in FIG. 6, the method includes the following.

In block 601, an expected interruption time is determined for the multi-card UE to interrupt the to-be-transmitted service in the first communication system based on the first service information, and/or an expected time length that the multi-card UE is in the second communication system is determined based on the second service information.

In an embodiment, after obtaining the second service information of the to-be-transmitted service in the second communication system, the multi-card UE may further obtain the first service information of the to-be-transmitted service in the first communication system. Therefore, the multi-card UE can determine, based on the first service information, a duration required by the multi-card UE to process a service in the first communication system that needs to be processed as quickly as possible (e.g., services with high delay requirements or services with high quality of service), to determine the expected interruption time for the multi-card UE to interrupt the to-be-transmitted service in the first communication system.

In an embodiment, the multi-card UE may also determine a time length required by the multi-card UE to execute the service in the second communication system based on the second service information, to determine the expected time length that the multi-card UE communicates with the second communication system.

In an embodiment, the multi-card UE may also determine the expected interruption time that the multi-card UE interrupts the to-be-transmitted service in the first communication system and the expected time length that the multi-card UE communicates with the second communication system by comprehensively considering the first service information and the second service information.

In block 602, the expected interruption time and/or the expected time length are determined as the handover configuration information recommended by the multi-card UE.

In block 603, the handover configuration information recommended by the multi-card UE is added to the handover request signaling.

In block 604, the handover request signaling is sent to the first base station. The first base station is a base station of the first communication system that is currently communicating with the multi-card UE.

In this embodiment, as described in blocks 601 to 604, the multi-card UE can determine the recommended handover configuration information based on the first service information in the first communication system and the second service information in the second communication system, and send the recommended handover configuration information to the first base station through the handover request signaling. In this way, the first base station can directly set a reasonable handover configuration for the multi-card UE based on the handover configuration information recommended by the multi-card UE.

Figure 7:
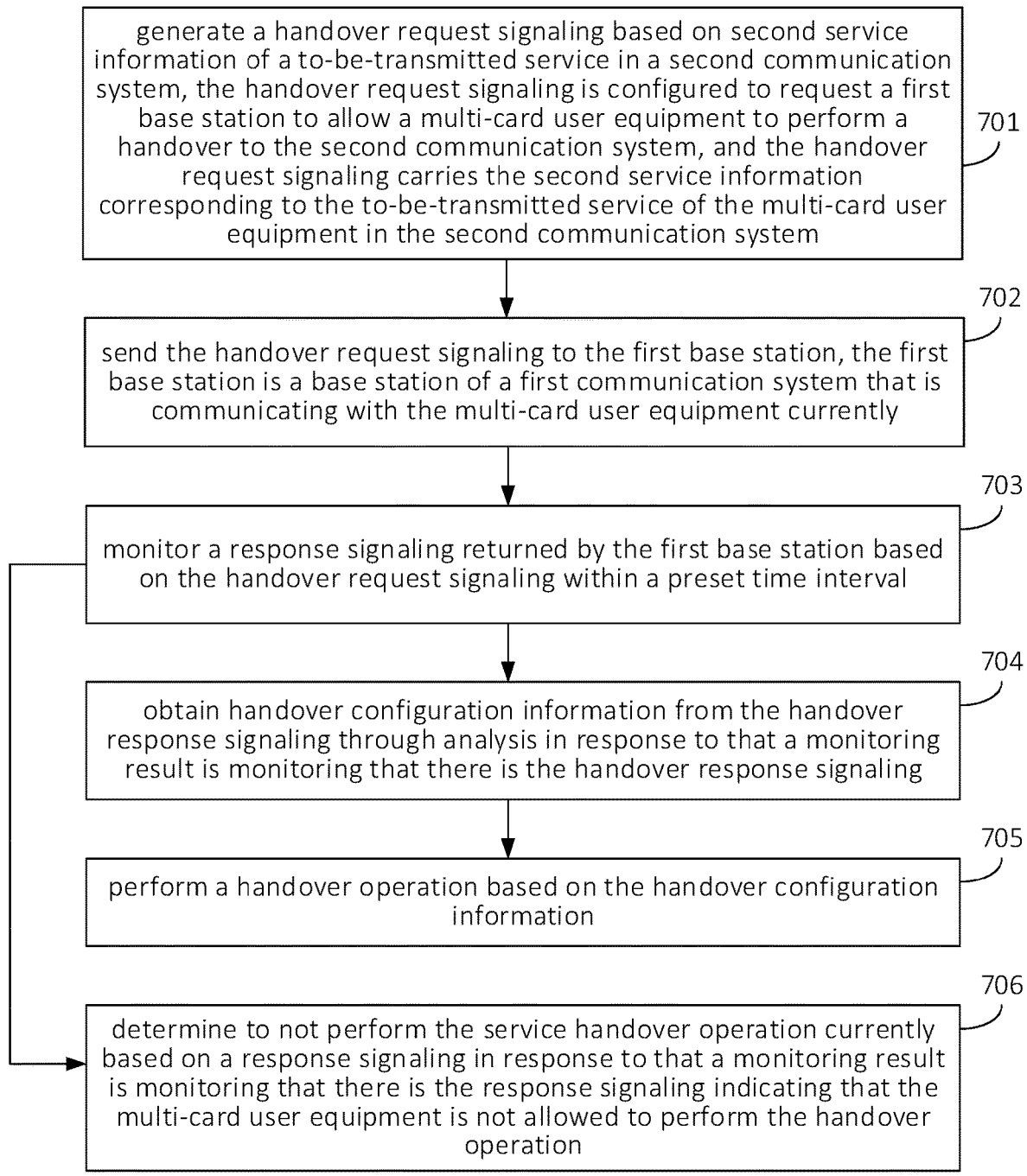
FIG. 7 is a flowchart illustrating yet another service handover method according to an example embodiment.

FIG. 7 is a flowchart illustrating another service handover method according to an exemplary embodiment, which illustrates how the multi-card UE executes the service handover operation with the above-mentioned method according to embodiments of the disclosure. As illustrated in FIG. 7, the method includes the following.

In block 701, a handover request signaling is generated based on the second service information of the to-be-transmitted service in the second communication system. The handover request signaling is configured to request the first base station to allow the multi-card UE to perform a handover to the second communication system. The handover request signaling carries the second service information corresponding to the to-be-transmitted service of the multi-card UE in the second communication system.

In block 702, the handover request signaling is sent to the first base station. The first base station is a base station of the first communication system with which the multi-card UE is currently communicating.

In an embodiment, the descriptions of the blocks 701 and 702 can refer to the descriptions of the blocks 501 and 502 of the embodiment illustrated in FIG. 5, which will not be described in detail here.

In block 703, a response signaling returned by the first base station based on the handover request signaling is monitored within a set time interval, and a block 704 or a block 706 is performed.

In block 704, if a monitoring result is monitoring that there is the handover response signaling, the handover configuration information is obtained from the handover response signaling through analysis.

In block 705, a handover operation is performed based on the handover configuration information.

In an embodiment, as described in blocks 703 to 705, when the multi-card UE monitors that there is the handover response signaling returned by the first base station for allowing the handover, the multi-card UE can trigger an operation when to perform the handover to the second communication system based on the handover configuration information and trigger an operation when to perform the handover back to the first communication system based on the handover configuration information for triggering the operation when to perform the handover to the second communication system.

In block 706, if the monitoring result is monitoring that there is a response signaling indicating that the multi-card UE is not allowed to perform the handover operation, it is determined that the service handover operation is not executed currently based on the response signaling.

In this embodiment, as described in blocks 701-706, it can be determined whether the service handover operation can be performed based on the monitoring result. A problem, existing in related arts, of poor service continuity and low service transmission efficiency of the multi-card UE caused by the multi-card UE blindly rejecting or responding to the service of the second communication system can be solved, thereby improving the service continuity and the transmission efficiency of the service data of the multi-card UE.

Figure 8:
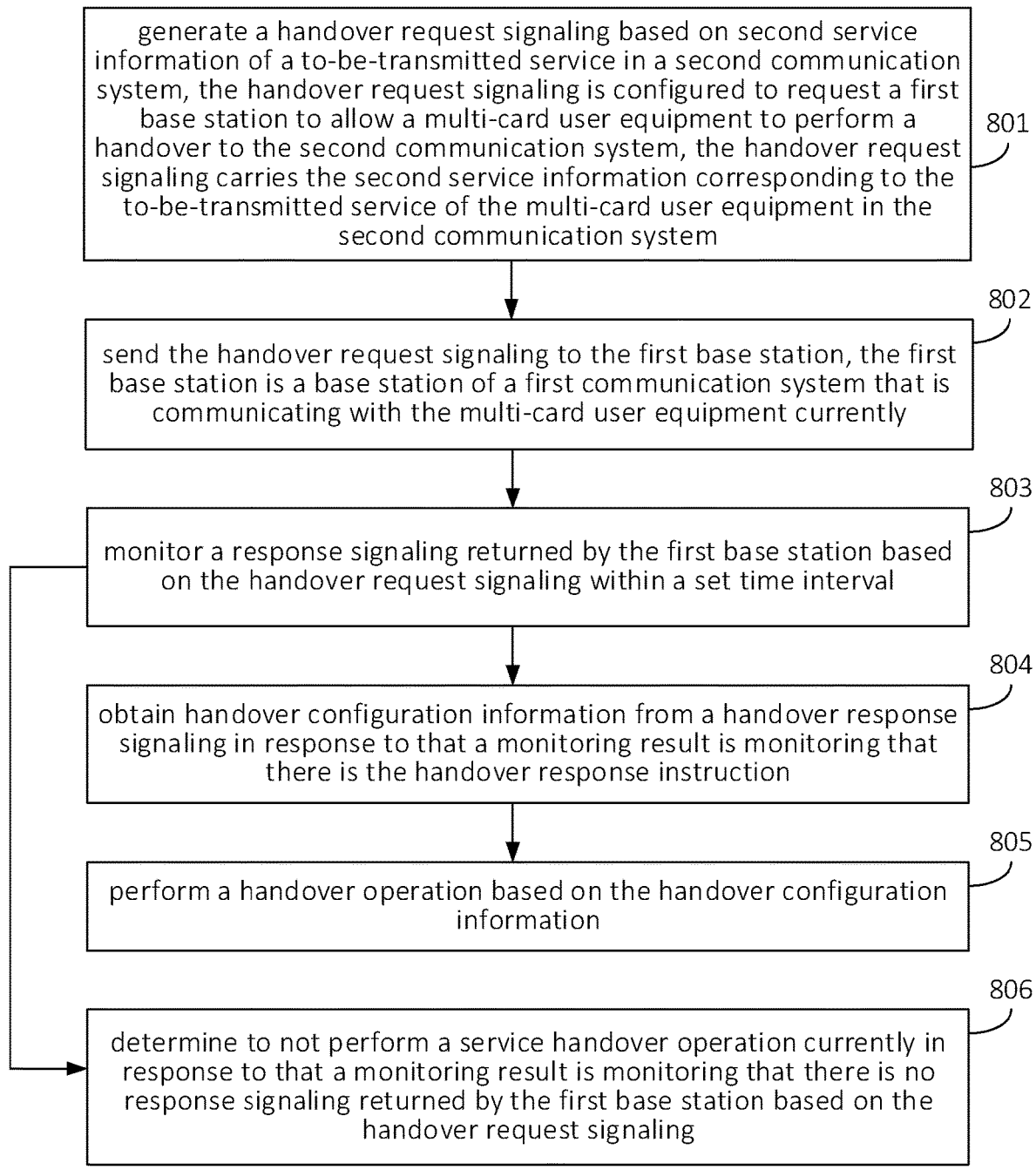
FIG. 8 is a flowchart illustrating yet another service handover method according to an example embodiment.

FIG. 8 is a flowchart illustrating another service handover method according to an example embodiment, which illustrates the multi-card UE with the above-mentioned method according to embodiments of the disclosure. As illustrated in FIG. 8, the method includes the following.

In block 801, a handover request signaling is generated based on the second service information of the to-be-transmitted service in the second communication system. The handover request signaling is configured to request the first base station to allow the multi-card UE to perform a handover to the second communication system. The handover request signaling carries the second service information corresponding to the to-be-transmitted service of the multi-card UE in the second communication system.

In block 802, the handover request signaling is sent to the first base station. The first base station is a base station of the first communication system with which the multi-card UE is currently communicating.

In block 803, the response signaling returned by the first base station based on the handover request signaling is monitored within a set time interval, and a block 804 or a block 806 is performed.

In block 804, if the monitoring result is monitoring that there is the handover response signaling, the handover configuration information is obtained from the handover response signaling through analysis.

In block 805, the handover operation is performed based on the handover configuration information.

In block 806, if the monitoring result is monitoring that there is no response signaling returned by the first base station based on the handover request signaling, it is determined that the service handover operation is not currently performed.

In this embodiment, as described in blocks 801 to 806, it is possible to determine whether the service handover operation can be performed currently based on the monitoring result. When it is monitored that there is no response signaling returned by the first base station based on the handover request signaling, it is determined that the first base station does not allow to perform the handover operation, which can reduce the waste of signaling resources caused by the first base station sending the response signaling in cases of allowing or not allowing the service handover.

Figure 9:
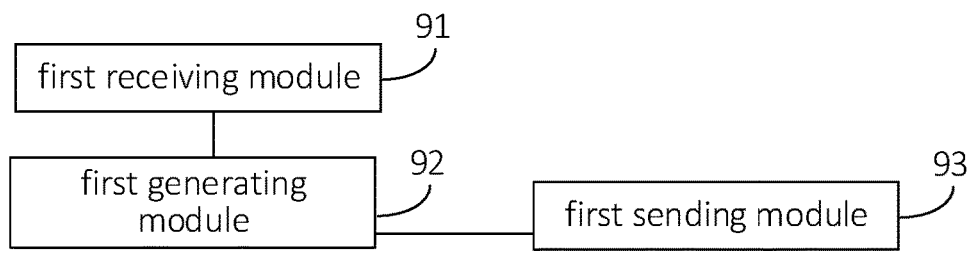
FIG. 9 is a block diagram illustrating a service handover apparatus according to an example embodiment.

FIG. 9 is a block diagram illustrating a service handover apparatus according to an example embodiment, which is applied to a first base station. The first base station is a base station of a first communication system that a multi-card UE is currently communicating with. As illustrated in FIG. 9, the service handover apparatus includes a first receiving module 91, a first generating module 92, and a first sending module 93.

The first receiving module 91 is configured to receive a handover request signaling sent by the multi-card UE. The handover request signaling is configured to request a handover to a second communication system. The handover request signaling carries second service information. The second service information is service information of a to-be-transmitted service of the multi-card UE in the second communication system.

The first generating module 92 is configured to generate a handover response signaling when it is determined to allow the multi-card UE to perform a handover operation based on first service information and the second service information carried in the handover request signaling. The handover response signaling carries handover configuration information. The first service information is service information corresponding to a to-be-transmitted service of the multi-card UE in the first communication system;

The first sending module 93 is configured to send the handover response signaling generated by the first generating module 93 to the multi-card UE.

Figure 10:
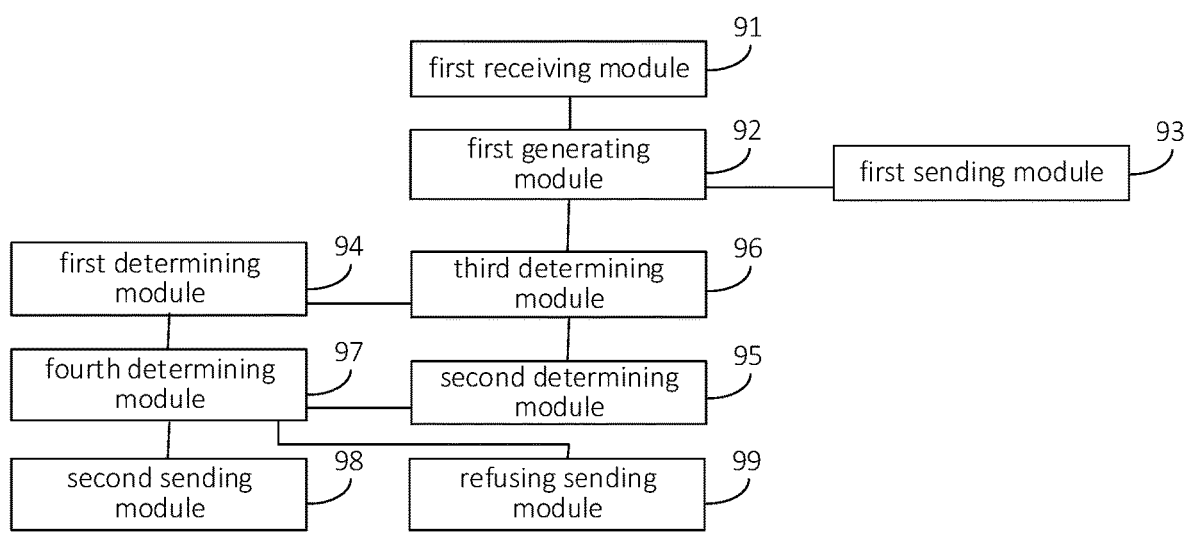
FIG. 10 is a block diagram illustrating another service handover apparatus according to an example embodiment.

FIG. 10 is a block diagram illustrating another service handover apparatus according to an example embodiment. As illustrated in FIG. 10, based on embodiments illustrated in FIG. 9, in an embodiment, the second service information includes a service type of the to-be-transmitted service of the multi-card UE in the second communication system, and/or a quality of service class identifier of the to-be-transmitted service of the multi-card UE in the second communication system, and/or a data volume of the to-be-transmitted service of the multi-card UE in the second communication system.

The first service information includes a service type of the to-be-transmitted service of the multi-card UE in the first communication system, and/or a quality of service class identifier of the to-be-transmitted service of the multi-card UE in the first communication system, and/or a data volume of the to-be-transmitted service of the multi-card UE in the first communication system.

In an embodiment, the apparatus further includes a first determining module 94, a second determining module 95, and a third determining module 96.

The first determining module 94 is configured to determine a first processing priority corresponding to the to-be-transmitted service in the first communication system based on the first service information.

The second determining module 95 is configured to determine a second processing priority corresponding to the to-be-transmitted service in the second communication system based on the second service information.

The third determining module 96 is configured to determine to allow the multi-card UE to perform the handover operation when the first processing priority is lower than the second processing priority.

In an embodiment, the device further includes: a fourth determining module 97 and a second sending module 98 or a sending refusing module 99.

The fourth determining module 97 is configured to determine to not allow the multi-card UE to perform the handover operation when the first processing priority is not lower than the second processing priority.

The second sending module 98 is configured to send, to the multi-card UE, a response signaling indicating that the multi-card UE is not allowed to perform the handover operation.

The sending refusing module 99 is configured to refuse sending a response signaling to the multi-card UE.

Figure 11:
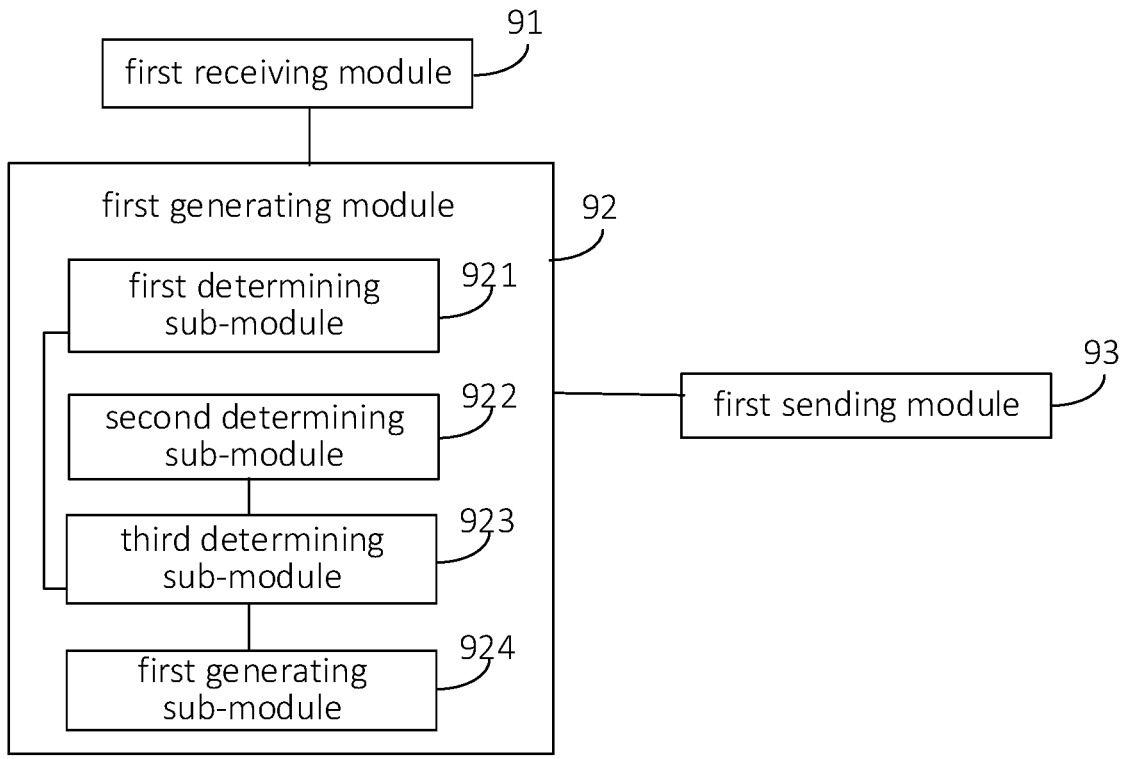
FIG. 11 is a block diagram illustrating another service handover apparatus according to an example embodiment.

FIG. 11 is a block diagram illustrating another service handover apparatus according to an example embodiment. As illustrated in FIG. 11, based on embodiment illustrated in FIG. 9, in an embodiment, the first generating module 92 includes a first determining sub-module 921 and/or a second determining sub-module 922, a third determining sub-module 923, and a first generating sub-module 924.

The first determining submodule 921 is configured to determine an expected interruption time for the multi-card UE to interrupt the to-be-transmitted service in the first communication system based on the first service information.

The second determining submodule 922 is configured to determine an expected time length for the multi-card UE being in the second communication system based on the second service information.

The third determining sub-module 923 is configured to determine the expected interruption information and/or the expected time length as the handover configuration information.

The first generating sub-module 924 is configured to generate the handover response signaling carrying the handover configuration information.

Figure 12:
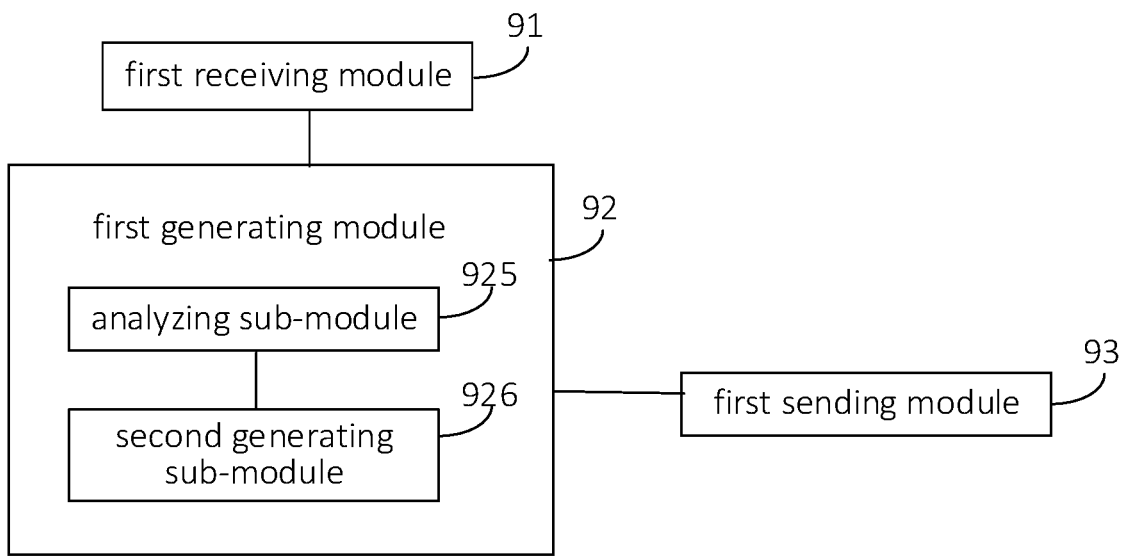
FIG. 12 is a block diagram illustrating another service handover apparatus according to an example embodiment.

FIG. 12 is a block diagram illustrating another service handover apparatus according to an example embodiment. As illustrated in FIG. 12, based on embodiments illustrated in FIG. 9, in an embodiment, the first generating module 92 includes an analyzing sub-module 925 and a second generating sub-module 926.

The analyzing sub-module 925 is configured to obtain the handover configuration information recommended by the multi-card UE from the handover request signaling through analysis.

The second generating sub-module 926 is configured to generate the handover response signaling carrying the handover configuration information recommended by the multi-card UE.

Based on embodiments disclosed in any one of the foregoing FIGS. 9 to 12, the first base station can determine whether to allow the multi-card UE to perform the handover based on the first service information corresponding to the to-be-transmitted in the first communication system and the second service information corresponding to the to-be-transmitted in the second communication system when receiving the handover request signaling for requesting a handover to the second communication system send by the multi-card UE, and send the handover response signaling carrying the handover configuration information to the multi-card UE when determining to allow the multi-card UE to perform the handover. Therefore, with the technical solutions of the disclosure, when a paging signaling is triggered by the second communication system of the multi-card UE, the first base station can perform an operation of rejecting or responding to the service of the second communication system after comprehensively considering the service information of the first communication system and the second communication system. Therefore, it is possible to set a handover configuration that is most suitable for a current network scenario for the service handover of the multi-card UE. A problem, existing in related arts, of poor service continuity and low service transmission efficiency of the multi-card UE caused by the multi-card UE blindly rejecting or responding to the service of the second communication system can be solved, thereby improving the service continuity and the transmission efficiency of the service data of the multi-card UE.

Figure 13:
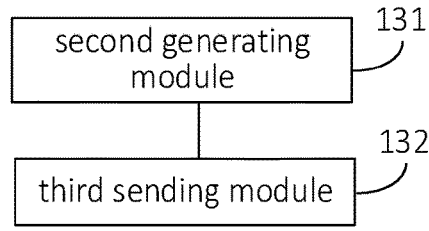
FIG. 13 is a block diagram illustrating a service handover apparatus according to an example embodiment.

FIG. 13 is a block diagram illustrating a service handover apparatus according to an example embodiment, which is applied to a multi-card UE. The apparatus includes a second generating module 131 and a third sending module 132.

The second generating module 131 is configured to generate a handover request signaling based on the second service information of the to-be-transmitted service in the second communication system. The handover request signaling is configured to request the first base station to allow multi-card UE to perform a handover to the second communication system. The handover request signaling carries second service information corresponding to the to-be-transmitted service of the multi-card UE in the second communication system.

The third sending module 132 is configured to send the handover request signaling generated by the second generating module to the first base station. The first base station is a base station of the first communication system with which the multi-card UE is currently communicating.

Figure 14:
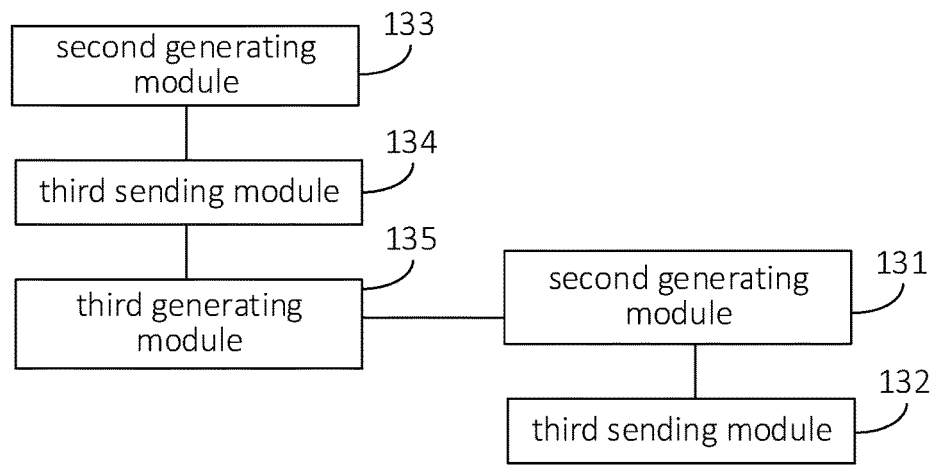
FIG. 14 is a block diagram illustrating another service handover apparatus according to an example embodiment.

FIG. 14 is a block diagram illustrating another service handover device according to an example embodiment. As illustrated in FIG. 14, based on embodiments illustrated in FIG. 13, in an embodiment, the second service information includes a service type of the to-be-transmitted service of the multi-card UE in the second communication system, and/or a quality of service class identifier of the to-be-transmitted service of the multi-card UE in the second communication system, and/or a data volume of the to-be-transmitted service of the multi-card UE in the second communication system.

In an embodiment, the apparatus further includes a fifth determining module 133, a sixth determining module 1345, and a third generating module 135.

The fifth determining module 133 is configured to determine an expected interruption time for the multi-card UE to interrupt the to-be-transmitted service in the first communication system based on the first service information; and/or, determine an expected time length that the multi-card UE is in the second communication system based on the second service information.

The sixth determining module 134 is configured to determine the expected interruption time and/or the expected time length as the handover configuration information recommended by the multi-card UE.

The third generating module 135 is configured to add the handover configuration information recommended by the multi-card UE to the handover request signaling.

Figure 15:
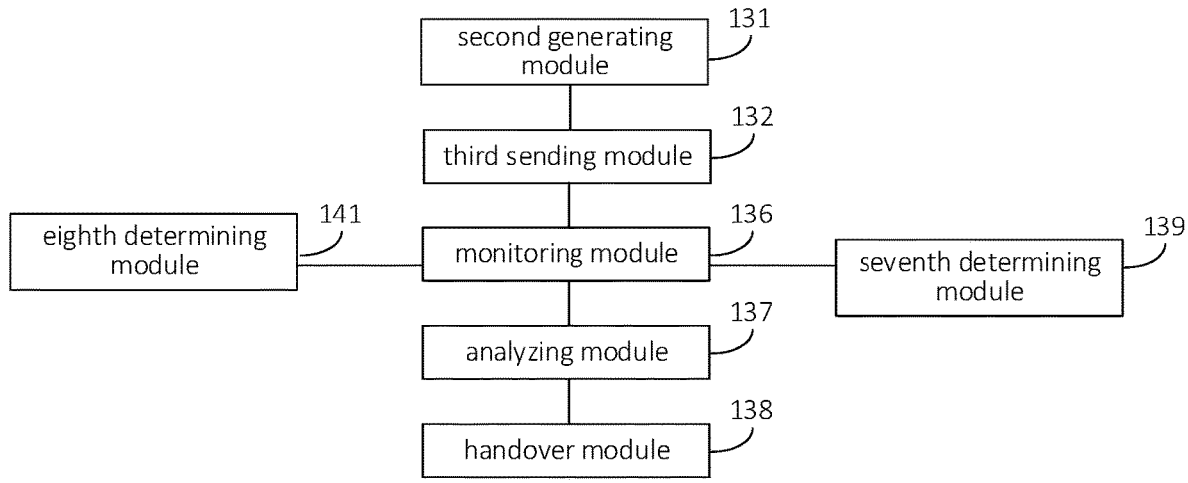
FIG. 15 is a block diagram illustrating another service handover apparatus according to an example embodiment.

FIG. 15 is a block diagram illustrating another service handover apparatus according to an example embodiment. As illustrated in FIG. 15, based on embodiments illustrated in FIG. 13, in an embodiment, the apparatus further includes a monitoring module 136, an analyzing module 137, and a handover module 138.

The monitoring module 136 is configured to monitor a response signaling returned by the first base station based on the handover request signaling within a set time interval.

The analyzing module 137 is configured to obtain the handover configuration information from the handover response signaling through analysis when a monitoring result of the monitoring module 136 is monitoring that there is the handover response signaling.

The handover module 138 is configured to perform the handover operation based on the handover configuration information.

In an embodiment, the apparatus further includes a seventh determining module 139.

The seventh determining module 139 is configured to determine to not perform the service handover operation currently based on a response signaling when the monitoring result of the monitoring module 136 is monitoring that there is the response signaling indicating that the multi-card UE is not allowed to perform the handover operation.

In an embodiment, the apparatus further includes an eighth determining module 141.

The eighth determining module 141 is configured to determine that the service handover operation is not currently performed when the monitoring result of the monitoring module 136 is monitoring that there is no response signaling returned by the first base station based on the handover request signaling.

Based on embodiments disclosed in any one of the above FIGS. 13-15, when the multi-card UE obtains the service information of the second communication system, the multi-card UE can send the handover request signaling to the first base station of the first communication system that is currently communicating with the multi-card UE. The multi-card UE can determine whether to allow the multi-card UE to perform the handover based on the first service information corresponding to the to-be-transmitted service and the second service information corresponding to the to-be-transmitted service in the second communication system. A problem, existing in related arts, of poor service continuity and low service transmission efficiency of the multi-card UE caused by the multi-card UE blindly rejecting or responding to the service of the second communication system can be solved, thereby improving the service continuity and the transmission efficiency of the service data of the multi-card UE.

As for the apparatus embodiments, since they basically correspond to the method embodiments, descriptions of the apparatus embodiments refer to the descriptions of the method embodiments. The apparatus embodiments described above are merely illustrative. The units described above as separate components may or may not be physically separated, and the components displayed as units may or may not be physical units, that is, they may be placed in one unit or can be distributed to multiple network units. Some or all modules can be selected according to actual needs to achieve objectives of the solutions of the disclosure. Those of ordinary skill in the art can understand and implement other embodiments without creative work.

The disclosure further provides a non-transitory computer-readable storage medium, having a computer program stored thereon. The computer program is configured to execute a paging method according to above FIGS. 1A to 4.

The disclosure further provides a non-transitory computer-readable storage medium, having a computer program stored thereon. The computer program is configured to execute a paging method according to the above FIGS. 5 to 8.

The disclosure further provides a base station, including a processor and a memory.

The memory is configured to store an instruction executable by the processor.

The processor is configured to receive a handover request signaling sent by the multi-card UE. The handover request signaling is configured to request the first base station to allow the multi-card UE to perform the handover to the second communication system.

The processor is configured to obtain the second service information corresponding to the to-be-transmitted service of the multi-card UE in the second communication system from the handover request signaling through analysis.

The processor is configured to generate a handover response signaling when determining to allow the multi-card UE to perform the handover operation based on the first service information and the second service information. The handover response signaling carries the handover configuration information. The first service information is service information corresponding to the to-be-transmitted service of the multi-card UE in the first communication system.

The processor is configured to send the handover response signaling to multi-card UE.

The disclosure further provides a multi-card UE, including a processor and a memory.

The memory is configured to store an instruction executable by the processor.

The processor is configured to generate a handover request signaling based on the second service information of the to-be-transmitted service in the second communication system. The handover request signaling is configured to request the first base station to allow the multi-card UE to perform a handover to the second communication system. The handover request signaling carries the second service information corresponding to the to-be-transmitted service of the multi-card UE in the second communication system.

The processor is further configured to send a handover request signaling to the first base station. The first base station is a base station of the first communication system with which the multi-card UE is currently communicating.

According to a seventh aspect of embodiments of the disclosure, a non-transitory computer-readable storage medium is provided. The storage medium has a computer instruction stored thereon. The instruction is executed by a processor to perform the above-mentioned service handover method according to the first aspect.

When the base station of the first communication system that is currently communicating with the multi-card user equipment receives the handover request signaling sent by the multi-card user equipment, in which the handover request signaling is configured to request a handover to the second communication system, it can be determined whether to allow the multi-card user equipment to perform the handover based on the first service information corresponding to the to-be-transmitted service of the first communication system and the second service information corresponding to the to-be-transmitted service of the second communication system. When determining to allow the multi-card user equipment to perform the handover, the handover response signaling carrying the handover configuration information is sent to the multi-card user equipment. Therefore, in the technical solution of the disclosure, when the paging signal is triggered by the second communication system of the multi-card user equipment, the service information of the first communication system and the second communication system is comprehensively considered before rejecting or responding to the second communication system. Therefore, with the technical solutions according to the disclosure that the service of the second communication system is rejected or responded to after comprehensively considering the service information of the first communication system and the second communication system when a paging signaling triggered by the second communication system is received by the multi-card user equipment, such that a problem, existing in related arts, of poor service continuity and low service transmission efficiency of the multi-card equipment caused by the multi-card equipment blindly rejecting or responding to the service of the second communication system can be solved, thereby improving the service continuity and the transmission efficiency of the service data of the multi-card equipment.

Figure 16:
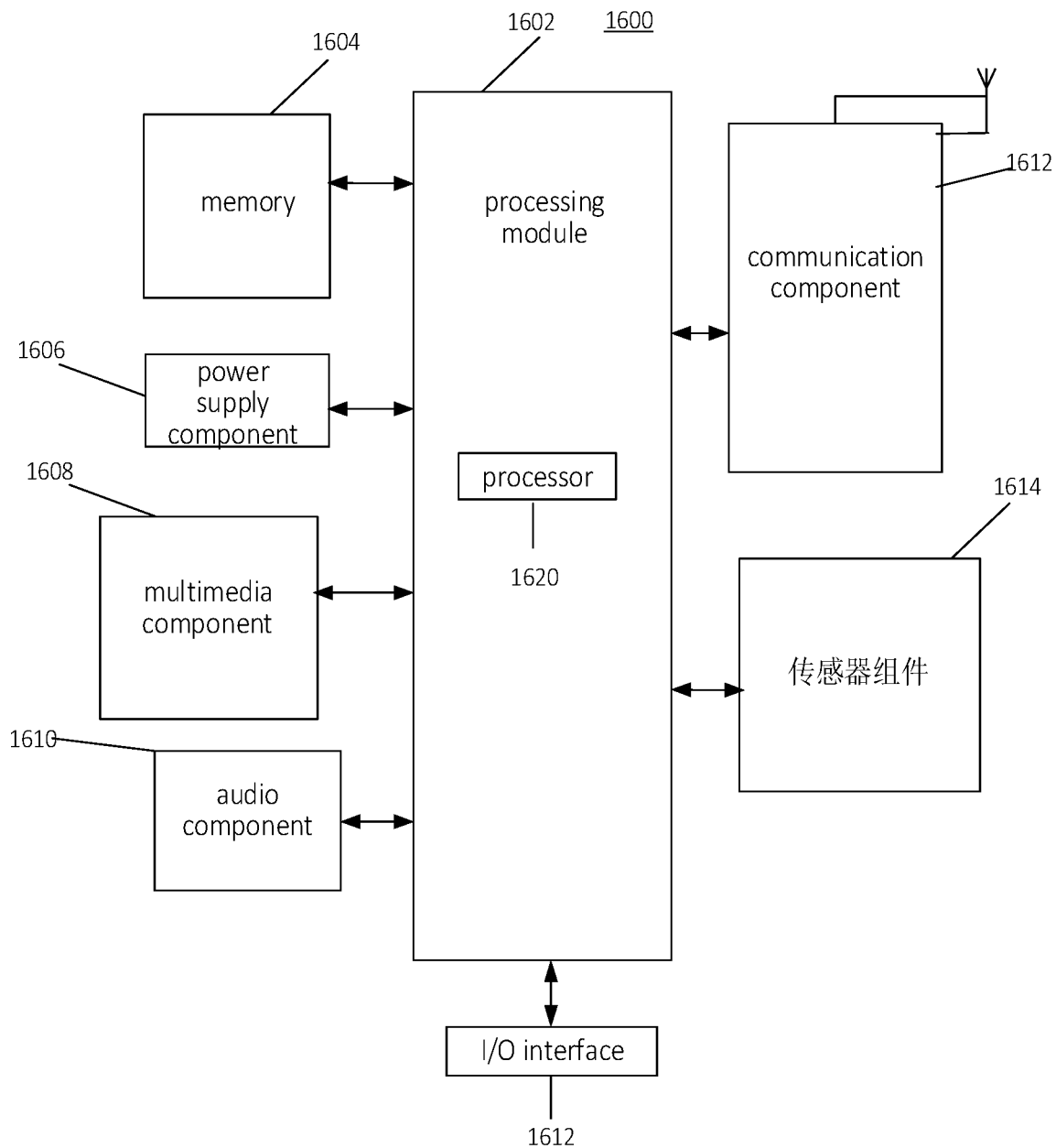
FIG. 16 is a block diagram illustrating a device suitable for service handover according to an example embodiment.

FIG. 16 is a block diagram illustrating a device suitable for the service handover according to an example embodiment. As illustrated in FIG. 16, the service handover device 1600 is illustrated according to an example embodiment. The device 1600 may be a computer, a mobile phone, a digital broadcasting terminal, a messaging device, a game console, a tablet device, a medical device, or a fitness device, a personal digital assistant, and other terminals. Multiple subscriber identity modules are provided in the device.

As illustrated in FIG. 16, the device 1600 may include one or more of the following components: a processing component 1601, a memory 1602, a power supply component 1603, a multimedia component 1604, an audio component 1605, an input/output (I/O) interface 1606, a sensor component 1607, and a communication component 1608.

The processing component 1601 generally controls the overall operations of the device 1600, such as operations associated with display, telephone calls, data communications, camera operations, and recording operations. The processing component 1601 may include one or more processors 1608 to execute instructions to complete all or part of the steps of the foregoing method. In addition, the processing component 1601 may include one or more modules to facilitate the interaction between the processing component 1601 and other components. For example, the processing component 1601 may include a multimedia module to facilitate the interaction between the multimedia component 1604 and the processing component 1601.

The memory 1602 is configured to store various types of data to support the operation of the device 1600. Examples of such data include instructions for any application or method operating on the device 1600, contact data, phone book data, messages, pictures, videos, etc. The memory 1602 can be implemented by any type of volatile or non-volatile storage device or their combination, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 1603 provides power to various components of the device 1600. The power supply component 1603 may include a power management system, one or more power supplies, and other components associated with the generation, management, and distribution of power for the device 1600.

The multimedia component 1604 includes a screen that provides an output interface between the device 1600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 1604 includes a front camera and/or a rear camera. When the device 1600 is in an operation mode, such as a shooting mode or a video mode, the front camera and/or the rear camera can receive external multimedia data. Each front camera and rear camera can be a fixed optical lens system or have focal length and optical zoom capabilities.

The audio component 1605 is configured to output and/or input audio signals. For example, the audio component 1605 includes a microphone (MIC), and when the device 1600 is in an operation mode, such as a call mode, a recording mode, and a voice recognition mode, the microphone is configured to receive external audio signals. The received audio signal may be further stored in the memory 1602 or transmitted via the communication component 1608. In some embodiments, the audio component 1605 further includes a speaker for outputting audio signals.

The I/O interface 1606 provides an interface between the processing component 1601 and a peripheral interface module. The above-mentioned peripheral interface module may be a keyboard, a click wheel, a button, and so on. These buttons may include, but are not limited to: home button, volume button, start button, and lock button.

The sensor component 1607 includes one or more sensors for providing the device 1600 with various aspects of state assessment. For example, the sensor component 1607 can detect the open/close state of the device 1600 and the relative positioning of components, such as the display and keypad of the device 1600. The sensor component 1607 can also detect the position change of the device 1600 or a component of the device 1600. The presence or absence of contact with the device 1600, the orientation or acceleration/deceleration of the device 1600, and the temperature change of the device 1600. The sensor component 1607 may include a proximity sensor configured to detect the presence of nearby objects when there is no physical contact. The sensor component 1607 may also include a light sensor, such as a CMOS or CCD image sensor, for use in imaging applications. In some embodiments, the sensor component 1607 may also include an acceleration sensor, a gyroscope sensor, a magnetic sensor, a pressure sensor, or a temperature sensor.

The communication component 1608 is configured to facilitate wired or wireless communication between the device 1600 and other devices. The device 1600 can access a wireless network based on a communication standard, such as WiFi, 2G, or 3G, or a combination thereof. In an exemplary embodiment, the communication component 1608 receives a broadcast signal or broadcast related information from an external broadcast management system via a broadcast channel. In an exemplary embodiment, the communication component 1608 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example embodiment, the device 1600 may be implemented by one or more application specific integrated circuits (ASIC), digital signal processors (DSP), digital signal processing devices (DSPD), programmable logic devices (PLD), A field programmable gate array (FPGA), a controller, a microcontroller, a microprocessor, or other electronic components are used to implement the paging method performed by the UE side.

In an example embodiment, there is also provided a non-transitory computer-readable storage medium including instructions, such as the memory 1602 including instructions, and the foregoing instructions may be executed by the processor 1608 of the device 1600 to complete the foregoing method. For example, the non-transitory computer-readable storage medium may be ROM, random access memory (RAM), CD-ROM, magnetic tape, floppy disk, optical data storage device, etc.

It is to be understood that the disclosure is not limited to the precise structure that has been described above and shown in the drawings, and various modifications and changes can be made without departing from its scope. The scope of the disclosure is only limited by the appended claims.

Figure 17:
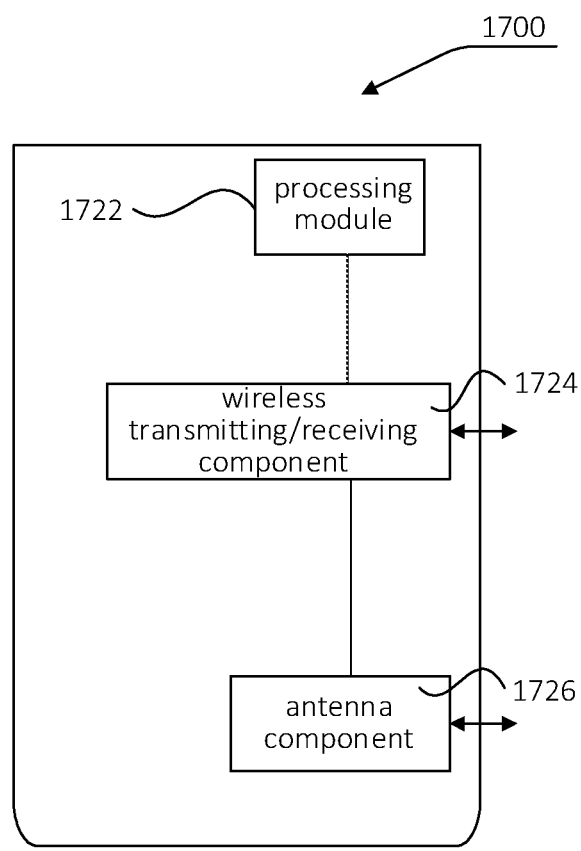
FIG. 17 is a block diagram illustrating a device suitable for service handover according to an example embodiment.

FIG. 17 is a block diagram illustrating a device suitable for service handover according to an example embodiment. The device 1700 may be provided as a base station. As illustrated in FIG. 17, the device 1700 includes a processing component 1722, a wireless transmitting/receiving component 1717, an antenna component 1726, and a signal processing part specific to a wireless interface. The processing component 1722 may further include one or more processors.

One of the processors in the processing component 1722 may be configured to execute the paging method executed by the base station side; or, one of the processors in the processing component 1722 may be configured to execute the paging method executed by the core network device.

After considering the specification and practicing the disclosure disclosed herein, those skilled in the art will easily think of other embodiments of the disclosure. This request is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are to be regarded as exemplary only, and the true scope and spirit of the disclosure are pointed out by the following claims.

After considering the specification and practicing the disclosure disclosed herein, those skilled in the art will easily think of other embodiments of the disclosure. This application is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are to be regarded as exemplary only, and the true scope and spirit of the disclosure are pointed out by the following claims.

It is to be understood that the disclosure is not limited to the precise structure that has been described above and shown in the drawings, and various modifications and changes can be made without departing from its scope. The scope of the disclosure is only limited by the appended claims.

What is claimed is:

1. A service handover method, performed by a first base station, the first base station being a base station of a first communication system that is currently communicating with a multi-card user equipment, the method comprising:
receiving a handover request signaling sent by the multi-card user equipment, wherein the handover request signaling is configured to request a handover to a second communication system, the handover request signaling carries second service information, and the second service information is service information of a to-be-transmitted service of the multi-card user equipment in the second communication system;
generating a handover response signaling in response to determining to allow the multi-card user equipment to perform a handover operation based on first service information and the second service information, wherein the handover response signaling carries handover configuration information, and the first service information is service information corresponding to a to-be-transmitted service of the multi-card user equipment in the first communication system; and
sending the handover response signaling to the multi-card user equipment;
wherein the method further comprises:
determining to not allow the multi-card user equipment to perform the handover operation in response to that a first processing priority corresponding to the to-be-transmitted service in the first communication system is not lower than a second processing priority corresponding to the to-be-transmitted service in the second communication system;
sending, to the multi-card user equipment, a response signaling indicating that the multi-card user equipment is not allowed to perform the handover operation; or
refusing to send a response signaling to the multi-card user equipment.

2. The method of claim 1, wherein the second service information comprises a service type of the to-be-transmitted service of the multi-card user equipment in the second communication system, a quality of service class identifier of the to-be-transmitted service of the multi-card user equipment in the second communication system, and/or a data volume of the to-be-transmitted service of the multi-card user equipment in the second communication system; and
the first service information comprises a service type of the to-be-transmitted service of the multi-card user equipment in the first communication system, and/or a quality of service class identifier of the to-be-transmitted service of the multi-card user equipment in the first communication system, and/or a data volume of the to-be-transmitted service of the multi-card user equipment in the first communication system.

3. The method of claim 2, wherein determining to allow the multi-card user equipment to perform the handover operation based on the first service information and the second service information, comprises:
determining the first processing priority corresponding to the to-be-transmitted service in the first communication system based on the first service information;
determining the second processing priority corresponding to the to-be-transmitted service in the second communication system based on the second service information; and
determining to allow the multi-card user equipment to perform the handover operation in response to that the first processing priority is lower than the second processing priority.

4. The method of claim 1, wherein generating the handover response signaling, comprises:
determining an expected interruption time for the multi-card user equipment to interrupt the to-be-transmitted service in the first communication system based on the first service information; or determining an expected time length that the multi-card user equipment is in the second communication system based on the second service information; or determining both the expected interruption time and the expected time length;
determining the expected interruption time, the expected time length, or both the expected interruption time and the expected time length as the handover configuration information; and
generating the handover response signaling carrying the handover configuration information.

5. The method of claim 1, wherein generating the handover response signaling, comprises:
obtaining handover configuration information recommended by the multi-card user equipment from the handover request signaling through analysis; and
generating the handover request signaling carrying the handover configuration information recommended by the multi-card user equipment.

6. A service handover method, performed by a multi-card user equipment, the method comprising:
generating a handover request signaling based on second service information of a to-be-transmitted service in a second communication system, wherein the handover request signaling is configured to request a first base station to allow the multi-card user equipment to perform a handover to the second communication system, and the handover request signaling carries the second service information corresponding to the to-be-transmitted service of the multi-card user equipment in the second communication system; and
sending the handover request signaling to the first base station, wherein the first base station is a base station of a first communication system that is currently communicating with the multi-card user equipment;
wherein the multi-card user equipment is not allowed to perform the handover operation in response to determining, by the first base station, that a first processing priority corresponding to the to-be-transmitted service in the first communication system is not lower than a second processing priority corresponding to the to-be-transmitted service in the second communication system; or the multi-card user equipment receives a response signaling indicating that the multi-card user equipment is not allowed to perform the handover operation; or the multi-card user equipment does not receive any response signaling.

7. The method of claim 6, wherein the second service information comprises a service type of the to-be-transmitted service of the multi-card user equipment in the second communication system, a quality of service class identifier of the to-be-transmitted service of the multi-card user equipment in the second communication system, and/or a data volume of the to-be-transmitted service of the multi-card user equipment in the second communication system.

8. The method of claim 7, further comprising:
determining an expected interruption time for the multi-card user equipment to interrupt a to-be-transmitted service in the first communication system based on first service information; or determining an expected time length that the multi-card user equipment is in the second communication system based on the second service information; or determining both the expected interruption time and the expected time length;
determining the expected interruption time, the expected time length, or both the expected interruption time and the expected time length as handover configuration information recommended by the multi-card user equipment; and
adding the handover configuration information recommended by the multi-card user equipment into the handover request signaling.

9. The method of claim 6, further comprising:
monitoring a response signaling returned by the first base station based on the handover request signaling within a set time interval;
obtaining the handover configuration information from the handover request signaling through analysis in response to that a monitoring result is monitoring that there is a handover response signaling; and
performing a handover operation based on the handover configuration information.

10. The method of claim 9, further comprising:
determining to not perform a service handover operation currently based on a response signaling, in response to that a monitoring result is monitoring that there is the response signaling indicating that the multi-card user equipment is not allowed to perform the handover operation.

11. The method of claim 9, further comprising:
determining to not perform a service handover operation currently, in response to that a monitoring result is monitoring that there is no response signaling returned by the first base station based on the handover request signaling.

12. A base station, comprising:
a processor; and
a memory, configured to store an instruction executable by the processor;
wherein the processor is configured to perform the method of claim 1.

13. The base station of claim 12, wherein the second service information comprises a service type of the to-be-transmitted service of the multi-card user equipment in the second communication system, a quality of service class identifier of the to-be-transmitted service of the multi-card user equipment in the second communication system, and/or a data volume of the to-be-transmitted service of the multi-card user equipment in the second communication system; and
the first service information comprises a service type of the to-be-transmitted service of the multi-card user equipment in the first communication system, and/or a quality of service class identifier of the to-be-transmitted service of the multi-card user equipment in the first communication system, and/or a data volume of the to-be-transmitted service of the multi-card user equipment in the first communication system.

14. The base station of claim 13, wherein the processor is configured to:
determine the first processing priority corresponding to the to-be-transmitted service in the first communication system based on the first service information;
determine the second processing priority corresponding to the to-be-transmitted service in the second communication system based on the second service information; and
determine to allow the multi-card user equipment to perform the handover operation in response to that the first processing priority is lower than the second processing priority.

15. A multi-card user equipment (UE), comprising:
a processor; and
a memory, configured to store an instruction executable by the processor;
wherein the processor is configured to:
generate a handover request signaling based on second service information of a to-be-transmitted service in a second communication system, wherein the handover request signaling is configured to request a first base station to allow the multi-card user equipment to perform a handover to the second communication system, and the handover request signaling carries the second service information corresponding to the to-be-transmitted service of the multi-card user equipment in the second communication system; and
send the handover request signaling to the first base station, wherein the first base station is a base station of a first communication system that is currently communicating with the multi-card user equipment;
wherein the multi-card user equipment is not allowed to perform the handover operation in response to determining, by the first base station, that a first processing priority corresponding to the to-be-transmitted service in the first communication system is not lower than a second processing priority corresponding to the to-be-transmitted service in the second communication system; or the multi-card user equipment receives a response signaling indicating that the multi-card user equipment is not allowed to perform the handover operation; or the multi-card user equipment does not receive any response signaling.

16. The UE of claim 15, wherein the second service information comprises a service type of the to-be-transmitted service of the multi-card user equipment in the second communication system, a quality of service class identifier of the to-be-transmitted service of the multi-card user equipment in the second communication system, and/or a data volume of the to-be-transmitted service of the multi-card user equipment in the second communication system.

17. A non-transitory computer readable storage medium, having a computer instruction stored thereon, wherein when the instruction is executed by a processor, a service handover method of claim 1 is executed.

18. A non-transitory computer readable storage medium, having a computer instruction stored thereon, wherein when the instruction is executed by a processor, a service handover method of claim 6 is executed.

* * * * *